March 4, 1958 A. L. SELJOS 2,825,361
VARIABLE RATIO VALVE
Filed Jan. 20, 1955 2 Sheets-Sheet 1

Supply Pressure

Delivery Pressure

Pilot Pressure

INVENTOR.
Arthur L. Seljos,
BY
ATTORNEY.

March 4, 1958  A. L. SELJOS  2,825,361
VARIABLE RATIO VALVE

Filed Jan. 20, 1955  2 Sheets-Sheet 2

INVENTOR.
Arthur L. Seljos,
BY
ATTORNEY

United States Patent Office 2,825,361
Patented Mar. 4, 1958

2,825,361
VARIABLE RATIO VALVE

Arthur L. Seljos, Houston, Tex., assignor, by mesne assignments, to Esso Research and Engineering Company, Elizabeth, N. J., a corporation of Delaware Application January 20, 1955, Serial No. 482,953

6 Claims. (Cl. 137—620)

The present invention is directed to a variable ratio valve. More particularly, the invention is directed to a valve for supplying fluid pressure. In its more specific aspects, the invention is directed to a control mechanism for supplying fluid pressure.

The present invention may be briefly described as a variable ratio valve adapted for use in pneumatic systems and the like. The invention comprises a valve housing which is provided with a supply port, a delivery port, an exhaust port, and a pilot pressure port. Arranged in the housing between the supply port and the delivery port is a regulating valve means for regulating passage of fluid under pressure from the supply port to the delivery port. The housing has first and second spaced apart flat diaphragms arranged in the housing between the delivery port and the pilot pressure port. A piston member is arranged between the diaphragms and bears frictionally against the face of the first diaphragm and against the face of the second diaphragm and varies the ratio of the effective working areas of the diaphragms when the diaphragms move from a first to a second position. The diaphragms are operatively connected to the regulating valve means such that pressure exerted against the diaphragms moves the diaphragms from a first to a second position and operates the valve means to regulate the fluid pressure.

The present invention will be further illustrated by reference to the drawing in which.

Figure 1:
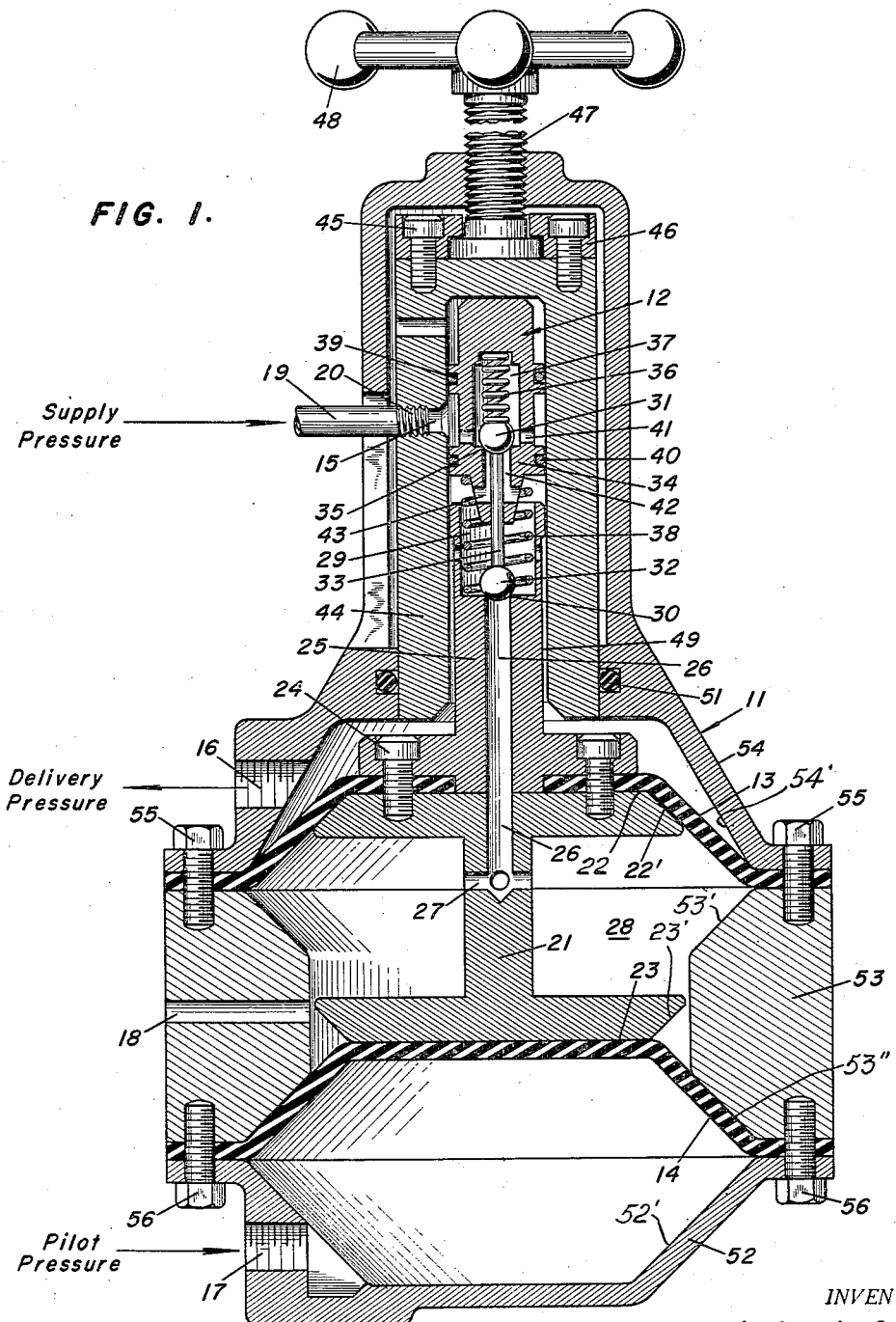
Fig. 1 is a sectional view of the device of the present invention.

In the drawing, numeral 11 designates a valve housing in which is arranged a regulating valve means generally indicated by the numeral 12 and a first diaphragm 13 and a second diaphragm 14 spaced apart from the first diaphragm. The valve housing 11 is provided with a fluid supply port 15, a delivery port 16, a pilot pressure port 17 and an exhaust port 18. The delivery port 15 has a conduit 19 threadably connected to an annular member 44 by mating threads 20.

Arranged between the diaphragms 13 and 14 is a piston member 21 which has an upper surface 22 bearing against the underface of the diaphragm 13 and is provided with an outwardly inclined surface portion 22' which bears against the underface of the diaphragm 13 in the upper or maximum area positions of diaphragm 13. Piston member 21 also has a lower surface 23 which bears against the upper face of the diaphragm 14 and is provided with an inwardly inclined surface portion 23' which bears against the upper surface of the diaphragm 14 in the lower or maximum positions of diaphragm 14.

Connected to the piston 21 by threaded screws 24 is a piston arm 25. The threaded screws 24 serve to connect the diaphragm 13 and the piston 21 to the piston arm 25. The piston arm 25 and the piston member 21 are provided with a longitudinally extending passageway 26 which exhausts through lateral passageways 27 into the space 28 between the diaphragms 13 and 14 and to the atmosphere by exhaust port 18.

The upper end of the piston arm 25 has a recess space 29 which with passageway 26 defines a seating surface 30. The valve member 12 is comprised of spaced apart spherical valve members 31 and 32 interconnected by longitudinally extending member 33. The valve 12 has a seating member 34 provided with a seating surface 35 on which the spherical member 31 seats.

The spherical member 31 is normally biased into seating engagement with the seat 35 by a spring member, such as a helical coil spring 36, arranged in recess 37. A helical coil spring 38 in the recess 29 bears against the seating member 34 and serves to urge the valve member 12 away from the piston arm 25. Sealing members, such as O-rings 39 and 40, provide a seal to isolate the ports 41 of the valve 12 which communicate the port 15 with the passageway 42 through which the interconnecting member 33 protrudes and with the lateral passageways 43.

The piston arm 25 and the valve member 12 are arranged in an annular valve housing 44 to which is connected by means of threaded screws 45 a valve plate 46 in which is arranged a valve positioning shaft 47 having a handle or wheel 48.

It is to be noted that a space 49 communicates the passageway 43 with the delivery port 16. Also it is to be noted that the annular member 44 is fluidly sealed against leakage by a sealing means such as an O-ring 51.

The valve housing 11 may suitably be constructed in several parts for ease of access thereto and, for example, may have a bottom plate or closure member 52 in which the pilot pressure port 17 is arranged and may be constructed with a center plate 53 in which the exhaust port 18 is arranged. The upper part of the housing 11 may suitably be a bonnet 54 which is attached to the center plate 53 by threaded screws 55, the closure member 52 being connected to the plate 53 by threaded screws 56. Center plate 53 is provided with upper and lower oppositely directed inclined inner surfaces 53' and 53" respectively. Bonnet 54 and closure member 52 are also provided with inner oppositely directed inclined surfaces 54' and 52' respectively. These inclined surfaces co-act with the diaphragms to increase or decrease the effective areas of diaphragms 13 and 14 upon movement of piston member 21.

The operation of the present invention is as follows:

In the illustration as shown in Fig. 1, the diaphragm 13 is in its uppermost position and also is in its maximum effective area position. The diaphragm 14 is in its uppermost position and is also in its minimum effective area position. For example, if a pilot pressure of 60 pounds is exerted on diaphragm 14, a pressure of 40 pounds on diaphragm 13 would counteract it or hold the diaphragms in their present position. If the diaphragms were moved downwardly by means of threaded rod 47 the effective area of diaphragm 13 would gradually decrease and the effective area of diaphragm 14 would gradually increase. As the two diaphragms approach their mid position, that is between their uppermost and lowermost positions, the effective areas of each would be more or less equalized. If the diaphragms were extended to their lowermost position, the effective areas of the two would be reversed.

Figures 2, 3:
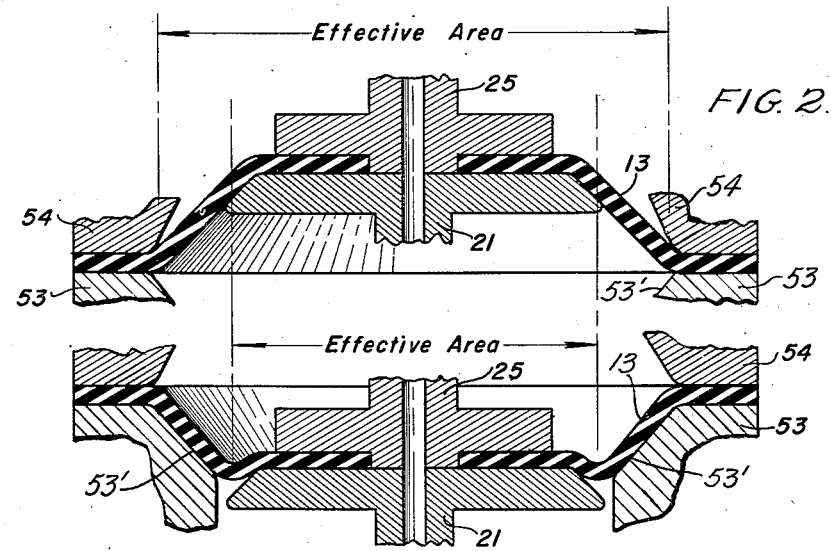
Figs. 2 and 3 are fragmentary views of a portion of the device shown in Fig. 1.

Figs. 2 and 3 are fragmentary views of the diaphragm 13, illustrating the change in the effective area as the diaphragm is moved from its upper position (Fig. 2) to its lower position (Fig. 3).

Thus the supply fluid introduced through conduit 19 to the port 15 passes into passageway 42 through ports 41 with the seating member 31 being off the seat 35. The fluid flows from passageway 42 to passageway 43 and thence through the space 49 and out through the delivery port 16. During this operation the valve member 32 is on the seat 30. When the pressure in the port 16 exceeds the pilot pressure delivered through line 17, then the diaphragm 13 would be forced downwardly changing the ratio of the effective areas of the diaphragms as is illustrated in Fig. 2. In other words, a variable ratio is then created.

Under these conditions, the pressure in port 16 would be exhausted through passageway 26 and lateral passageway 27 into space 28 and to the atmosphere through port 18, the seating member 31 seating on the seat 35 while the seat 30 would have moved away from the member 32 by virtue of the downward movement of the piston 21 and the piston arm 25.

The unit may be set, by virtue of the positioning shaft 47, to provide any ratio as desired.

It will be seen from the foregoing description taken with the drawing in which opposing diaphragms are arranged in a device in which the effective area of the diameters change as the diaphragms stroke to provide a variable ratio.

The device of the present invention is useful in pneumatic controls on braking systems such as on heavy busses and aircraft. Also it is important in well drilling operations and the like.

The nature and objects of the present invention having been completely described and illustrated, what I wish to claim as new and useful and to secure by Letters Patent is:

1. A variable ratio valve adapted for use in pneumatic systems which comprises, a valve housing having a supply port, a delivery port, and a pilot pressure port, regulating valve means arranged in said housing between said supply port and said delivery port for regulating passage of fluid under pressure from said supply port to said delivery port, first and second spaced apart opposing diaphragms arranged in said valve housing intermediate said delivery port and said pilot pressure port, said housing having oppositely directed inclined inner surfaces thereby providing a varying ratio for the effective working areas of said diaphragms, a piston member arranged between said diaphragms and bearing against a face of the first diaphragm and against a face of the second diaphragm, said diaphragms being operatively connected to said regulating valve means, pressure exerted against the diaphragms through the pilot pressure port moving said diaphragms thereby operating said regulating valve means to regulate the fluid pressure from said supply port to said delivery port, and adjusting means associated with said piston member adapted to vary the effective working areas of said diaphragms.

2. A variable ratio valve adapted for use in pneumatic systems which comprises, a valve housing having a supply port, a delivery port, and a pilot pressure port, regulating valve means arranged in said housing between said supply port and said delivery port for regulating passage of fluid under pressure from said supply port to said delivery port, first and second spaced apart opposing diaphragms arranged in said valve housing intermediate said delivery port and said pilot pressure port, said housing having oppositely directed inclined inner surfaces thereby providing a varying ratio for the effective working areas of said diaphragms, a piston member arranged between said diaphragms and bearing against the under face of the first diaphragm and against the upper face of the second diaphragm, said diaphragms being operatively connected to said regulating valve means, pressure exerted against the diaphragms through the pilot pressure port moving said diaphragms thereby operating said regulating valve means to regulate the fluid pressure from said supply port to said delivery port.

3. A variable ratio valve adapted for use in pneumatic systems which comprises, a valve housing having a supply port, a delivery port, and a pilot pressure port, regulating valve means arranged in said housing between said supply port and said delivery port for regulating passage of fluid under pressure from said supply port to said delivery port, first and second spaced apart opposing diaphragms arranged in said valve housing intermediate said delivery port and said pilot pressure port, said housing having oppositely directed inclined inner surfaces thereby providing a varying ratio for the effective working areas of said diaphragms, a piston member arranged between said diaphragms and bearing against the under face of the first diaphragm and against the upper face of the second diaphragm, and a piston arm operatively connected to said piston member and to said regulating valve means, pressure exerted against the diaphragms through the pilot pressure port moving said diaphragms thereby operating said regulating valve means to regulate the fluid pressure from said supply port to said delivery port, and adjusting means associated with said piston member adapted to vary the effective working areas of said diaphragms.

4. A variable ratio valve adapted for use in pneumatic systems which comprises, a valve housing having a supply port, a delivery port, and a pilot pressure port, regulating valve means arranged in said housing between said supply port and said delivery port for regulating passage of fluid under pressure from said supply port to said delivery port, first and second spaced apart opposing diaphragms arranged in said valve housing intermediate said delivery port and said pilot pressure port, said housing having oppositely directed inclined inner surfaces thereby providing a varying ratio for the effective working areas of said diaphragms, a piston member arranged between said diaphragms having an upwardly facing inclined surface bearing against the under face of the first diaphragm and having a downwardly facing inclined surface bearing against the upper face of the second diaphragm, said diaphragm being operatively connected to said regulating valve means, pressure exerted against the diaphragms through the pilot pressure port moving said diaphragms thereby operating said regulating valve means to regulate the fluid pressure from said supply port to said delivery port.

5. A variable ratio valve adapted for use in pneumatic systems which comprises, a valve housing having a supply port, a delivery port, and a pilot pressure port, regulating valve means arranged in said housing between said supply port and said delivery port for regulating passage of fluid under pressure from said supply port to said delivery port, first and second spaced apart opposing diaphragms arranged in said valve housing intermediate said delivery port and said pilot pressure port, said housing having oppositely directed inclined inner surfaces thereby providing a varying ratio for the effective working areas of said diaphragms, a piston member arranged between said diaphragms having an upwardly facing inclined surface bearing against the under face of the first diaphragm and having a downwardly facing inclined surface bearing against the upper face of the second diaphragm, and a piston arm operatively connected to said piston member and to said regulating valve means, fluid pressure exerted against the second diaphragm through the pilot pressure port moving said diaphragms thereby and operating said regulating valve means to regulate the fluid pressure from said supply port to said delivery port, and adjusting means associated with said piston member adapted to vary the effective working areas of said diaphragms.

6. A variable ratio valve adapted for use in pneumatic systems which comprises, a valve housing having a supply port, a delivery port, an exhaust port, and a pilot pressure port, regulating valve means comprised of first and second interconnected spherical members seating, respectively, on first and second seating members arranged in said housing between said supply port and said delivery port for regulating passage of fluid under pressure from said supply port to said delivery port, first and second spaced apart opposing flat diaphragms arranged in said valve housing intermediate said delivery port and said pilot pressure port with the first diaphragm being arranged intermediate said delivery port and said exhaust port, said housing having oppositely directed inclined inner surfaces thereby providing a varying ratio for the effective working areas of said diaphragms, a piston member arranged between said diaphragms having an upwardly facing inclined surface bearing against the under face of the first diaphragm and having a downwardly facing inclined surface bearing against the upper face of the second diaphragm, and a piston arm operatively connected to said piston member and to said regulating valve means, fluid pressure exerted against the second diaphragm through the pilot pressure port moving said diaphragms thereby operating said regulating valve means to regulate the fluid pressure from said supply port to said delivery port, said piston arm and said piston being provided with a passageway communicating the space between said diaphragms with said valve, said second seating member opening and closing said second passageway and said first seating member regulating passage of fluid from the supply port to the delivery port.

References Cited in the file of this patent

UNITED STATES PATENTS

| | | |
|---|---|---|
| 2,411,406 | Affleck | Nov. 19, 1946 |
| 2,659,381 | Seljos | Nov. 17, 1953 |